United States Patent [19]

Andersson et al.

[11] Patent Number: 5,704,338
[45] Date of Patent: Jan. 6, 1998

[54] FLYWHEEL MAGNETO GENERATOR

[75] Inventors: Martin N. Andersson, Caro; Michael J. Dale, Cass City, both of Mich.

[73] Assignee: Walbro Corporation, Cass City, Mich.

[21] Appl. No.: 779,279

[22] Filed: Jan. 6, 1997

[51] Int. Cl.[6] .................................................. F02P 3/06
[52] U.S. Cl. ............................................ 123/599; 123/149
[58] Field of Search ...................... 123/149 C, 149 D, 123/599, 602; 310/70 R, 70 A, 154

[56] References Cited

U.S. PATENT DOCUMENTS

| | | | |
|---|---|---|---|
| 3,629,632 | 12/1971 | Loupe | 123/149 D X |
| 3,732,483 | 5/1973 | Katsumata | 123/149 D X |
| 4,709,669 | 12/1987 | Wissmann et al. | 123/149 D |
| 5,477,841 | 12/1995 | Trost et al. | 123/599 |

*Primary Examiner*—Tony M. Argenbright
*Attorney, Agent, or Firm*—Barnes, Kisselle, Raisch, Choate, Whittemore & Hulbert

[57] ABSTRACT

A magneto generator for an engine having a flywheel, in which the flywheel comprises a rotor mounted for axial rotation and has a rim of magnetically permeable material. A magnetically permeable core has first and second ends located adjacent to the rim at circumferentially spaced points. At least two wire coils are wrapped on the core. The rim defines a permeability path between the ends of the core. A fixed magnet is placed on one end of the core. The rim is interrupted at circumferentially spaced points to provide walls and windows alternately making and breaking the permeability path when the rotor is rotated to produce voltage pulses in sinusoidal form in the coils. The positive half cycles in one of the coils is used to charge an ignition storage capacitor for energizing a spark plug. The negative half cycles in the other winding are used to charge a battery.

8 Claims, 2 Drawing Sheets

5,704,338

FLYWHEEL MAGNETO GENERATOR

FIELD OF INVENTION

This invention relates generally to magnetos and more particularly to a magneto for the ignition system of an engine.

BACKGROUND OF THE INVENTION

Typically, small two and four-stroke engines are equipped with flywheels and magneto ignitions. A magnet is mounted on the flywheel and the flux of the magnet is brought out to the working radius of the flywheel by pole shoes made of magnetically conductive material. In these systems, the ignition module is mounted as a stator assembly in fixed position and comprises a U-shaped core of magnetically conductive material, the ends of which are positioned close to the path of the pole shoes on the flywheel. The magnet on the rotating flywheel produces a magnetic field through the permeability path provided by the stator core. One or more coils are wrapped on the core and when the flux passes through the core, a voltage is generated in the coils. This generated voltage may be stored in a capacitor and stepped up by a transformer to the potential needed for ignition of the air/fuel mixture of the engine.

One disadvantage of this system is that the flux is generated in the core only once for each revolution of the flywheel. This represents approximately 15°–20° in the full 360° of one revolution of flywheel rotation. The system is electrically down during the balance of the cycle. Another disadvantage is in the manufacturing process which usually requires the magnet and an offsetting counterweight to be insert die cast into the flywheel. This causes uneven cooling of the casting, represents additional time and labor costs, and adversely affects the strength and structural integrity of the flywheel.

In a more recent development, the magnet, rather than being mounted on the flywheel, has been mounted on a core in a fixed position.

SUMMARY OF THE INVENTION

The present invention is an improvement on the more recent development described above. In accordance with this invention, the magnet is mounted on a core in a stationary module located closely adjacent to the flywheel. The flywheel has alternate walls and windows or gaps to open and close the permeability path during rotation of the flywheel. Voltage pulses in sinusoidal waveform are generated in a charge circuit on the core for each revolution of the flywheel.

The charge circuit is preferably composed of two coils and two diodes. During the positive half of the sine wave pulses, one of the coils produces the voltage needed to charge the ignition storage capacitor. During the negative half of the pulses, the other coil charges a battery. The battery provides a source of energy for other devices such as electric starter motors, solenoids, microprocessors, and stepper motors.

One object of this invention is to provide a magneto generator for an engine having the foregoing features and capabilities.

Another object is to provide a magneto generator which is composed of a relatively few simple parts, is rugged and durable in operation, and is simple and inexpensive to manufacture and assemble.

BRIEF DESCRIPTION OF THE DRAWINGS

These and other objects, features and advantages of the invention will become more apparent from the following description of the presently preferred embodiment and best mode, especially when considered with the appended claims and accompanying drawings, wherein:

DETAILED DESCRIPTION

Figure 1:
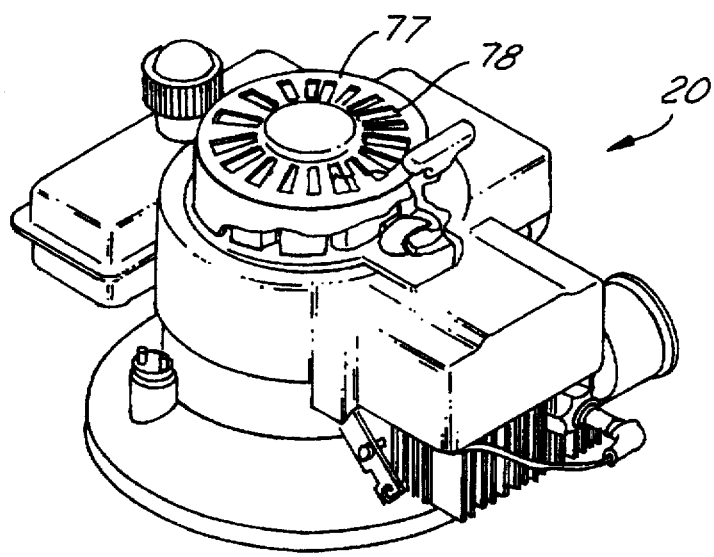
FIG. 1 is a perspective view of a small engine having a flywheel magneto generator constructed in accordance with the present invention.

Referring now more particularly to the drawings, and especially to FIGS. 1 to 4 thereof, the engine 20 is a small two or four-stroke engine of the type used to drive a lawn mower or snowblower, for example. The engine has a flywheel 22 with a rotor 24 which is mounted on the engine for axial rotation. More specifically, the flywheel 22 and rotor 24 are secured by a bolt 25 to the top of a vertical crankshaft 26 that is operatively connected by a rod to a piston (not shown) of the engine.

Figure 2:
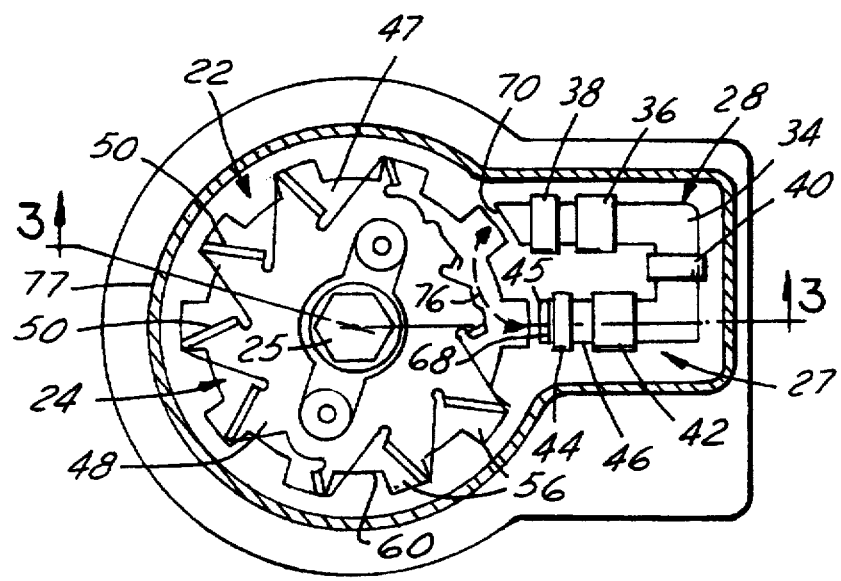
FIG. 2 is a top view, with parts in section, of the structure in FIG. 1, taken along the line 2—2 in FIG. 3.
Figure 3:
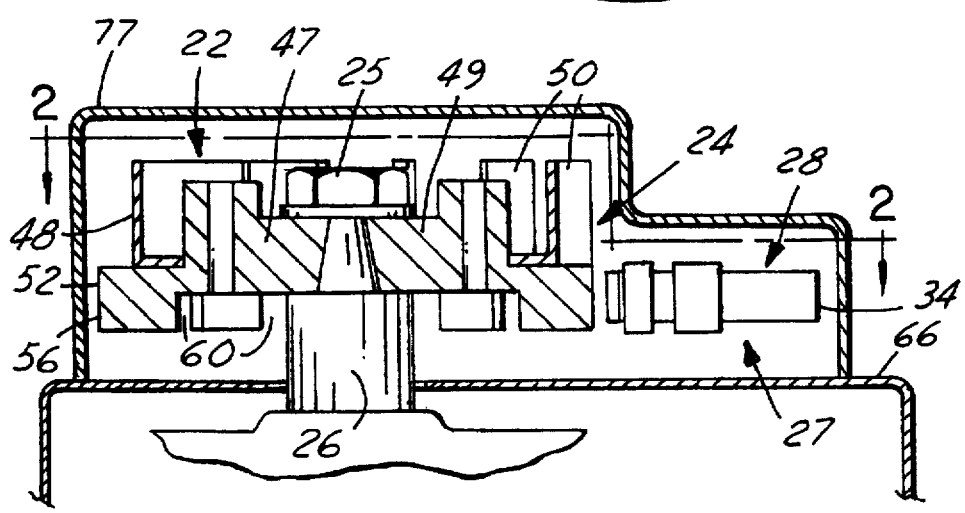
FIG. 3 is a sectional view taken on the line 3—3 in FIG. 2.
Figure 4:
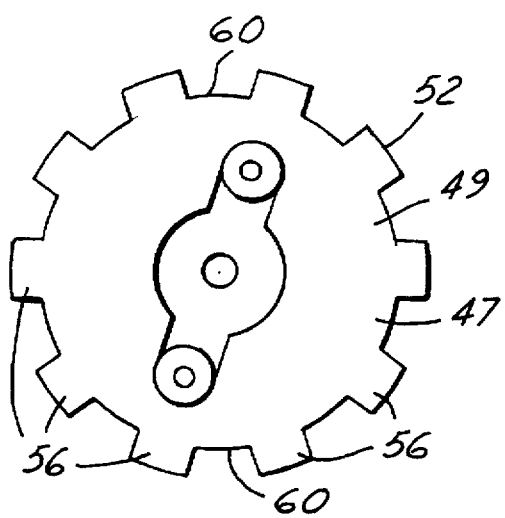
FIG. 4 is an enlarged top view of the reluctor wheel of the flywheel rotor.
Figure 5:
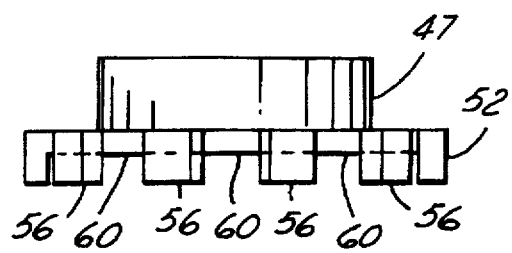
FIG. 5 is a side view of the reluctor wheel of FIG. 4.

As shown in FIG. 2, the engine 20 has a flywheel magneto generator 27 embodying this invention which includes the rotor 24, a stator module 28 having a core 34 with coils 36, 38, 40, 42 and 44 wrapped thereon, and a permanent magnet 45. The coils 42 and 44 are the primary and secondary of an exciter 46 for the spark plug SP.

The rotor 24 comprises a generally circular reluctor wheel 47 preferably formed of a laminated stack of discs made of a highly magnetically permeable material such, for example, as steel or a powdered metal mixture of iron and phosphorous. The rotor 24 also has a generally circular plate 48 of steel, for example, secured to the top surface of the body 49 of the wheel 47. The plate 48 is shaped to form vanes 50 bent to produce a flow of cooling air to the engine when the rotor rotates.

The wheel 46 has an integral cylindrical rim 52 which is perpendicular to the body 49 thereof. The rim 52 is notched to provide a plurality of equally, circumferentially spaced and axially extending walls or tabs 56. The tabs 56 are arranged in a circle forming segments of a cylinder concentric with the rotational axis of the rotor and perpendicular to the body 49 of the wheel, with spaces or gaps 60 forming windows between adjacent tabs.

The core 34 of the stator module 28 is generally U-shaped and is mounted in fixed position on a wall 66 of the engine body, at one side of the rotor 24. The core has a first end 68 and a second end 70 which are close to the circle of tabs 56. The core 34 is made of a highly magnetically permeable material such as a plurality of laminated plates of steel. The wire coils 36–44, each comprising a plurality of turns of an electrically conductive wire such as copper, are wrapped around the core. The magnet 45 is mounted on the first end 68 of the core between the core and the rotor. The magnet is made of any suitable magnetic material such, for example, as neodymium and is generally rectangular in form, preferably having the dimensions 9×9×5 millimeters. The space between the magnet 45 and the circle of the outer faces of the tabs 56 and likewise the space between the second end 70 of the core 34 and the circle of the outer faces of the tabs is on the order of about 0.3 millimeters to form a very small air gap.

The arcuate distance between the magnet 45 and the second end 70 of the core 34 is substantially the same as the arcuate distance between adjacent tabs 56, so that when one tab is opposite the magnet, the next adjacent tab is opposite the second core end 70, at which time the permeability path from one core end 68 to the other core end 70 passes through the rotor wheel 47, as shown by the broken line 76 in FIG. 2. The magnet 45 is in the permeability path. When a space 60 between tabs is opposite the magnet 45, the next adjacent space 60 is opposite the second end 70 of the core, thus breaking the permeability path so that the magnetic flux in the core 34 collapses. Thus, when the rotor is rotating, the tabs 56 and spaces 60 provide walls and windows or gaps alternately making and breaking the permeability path, producing an alternating sinusoidal wave form and voltage pulses in the coils 36-44. The sine wave is continuous and repeats during the rotation of the flywheel. The same wave form will be produced in all of the coils 36-44.

Rather than making the spacing between the ends of the core equal to the spacing between adjacent tabs, the spacing between the core ends could be any multiple of the spacing between adjacent tabs.

A cover plate 77 is secured to the engine body and encloses the rotor 24, the core 34, coils 36-44 and the magnet 45. Air is admitted through openings 78 in the cover plate 77.

In use during operation of the engine 20, the tabs 56 and spaces 60 of the rotor 24 rapidly make and break the permeability path several times during each revolution of the flywheel rotor 24, producing voltage pulses in the coils 36-44. The permeability path extends from tab to tab across the unnotched portion of the rotor between tabs during the full 360° of rotor rotation.

Figure 6:
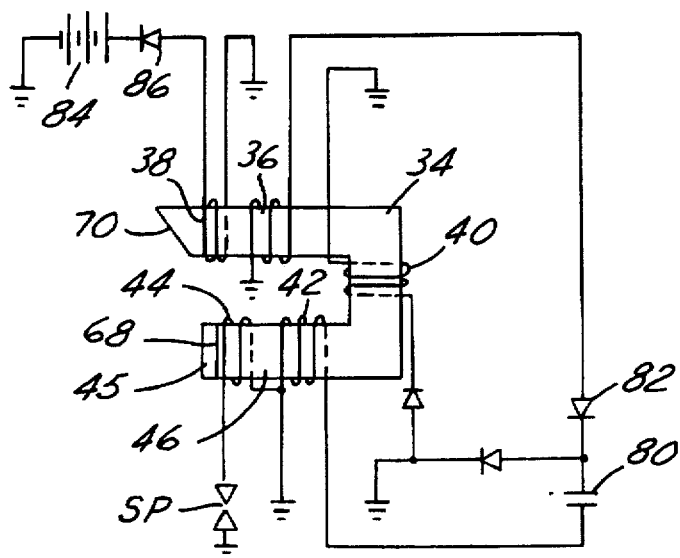
FIG. 6 is a schematic view showing the electronic and mechanical configuration of the invention including a circuit diagram.

Referring to FIG. 6, the coil 36 is the ignition charge coil which is connected to a capacitor 80 through a diode 82 which half-wave rectifies the current output so that the capacitor is charged with the positive half cycles only of the alternating current. The ignition charge coil 36 preferably has a large number of turns, for example 2500, of fine wire to generate the approximately 300 volts necessary for charging the capacitor.

The coil 38 is the battery charge coil which is connected to a battery 84 through a diode 86 which half-wave rectifies the current output so that the battery is charged with the negative half cycles only of the alternating current. The battery charge coil 38 preferably has fewer turns, for example 25-50, of a larger diameter wire to produce a series of pulses of approximately 12 volts to charge the battery. The battery thus provides a constant source of energy that can be used for electric starter motors, solenoids, microprocessors, stepper motors and other devices.

Figure 7:
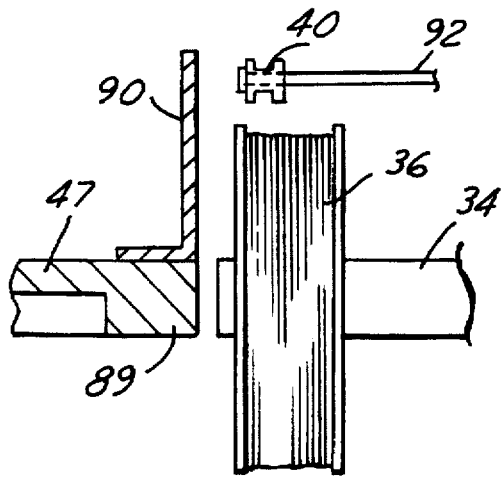
FIG. 7 is a fragmentary view showing the means by which the capacitor is triggered.

The coil 40 is the trigger coil which responds to a single magnetic pulse for each revolution of the flywheel. This may be accomplished by a sensor mounted near the periphery of the flywheel with an appropriate marking on the flywheel which the sensor detects. This may also be accomplished as shown in FIG. 7, where one tab 89 of the flywheel rotor has a plain stamped steel leg 90. The trigger coil may be mounted on a fixed structural element 92 very close to the circular path of the leg 90. The magnetic flux passes from the magnet 45 across the air gap to the tab 89, along the leg 90 and across the air gap to the trigger coil 40, and then by the air path to the core 34. This will produce a pulse in the coil 40 for each 360° of flywheel rotation sufficient to trigger the capacitor at the proper time to energize the primary coil 42 of the exciter 46 for the spark plug SP. The second coil 44 of the exciter produces a sufficiently high voltage to produce the spark.

What is claimed is:

1. A flywheel magneto generator for an engine comprising:

a flywheel rotor mounted for axial rotation and having a rim of magnetically permeable material, a core of magnetically permeable material having first and second ends disposed adjacent to said rim at circumferentially spaced points, a first coil wrapped on said core, a second coil wrapped on said core, said rim being adapted to define at least a portion of a permeability path between the ends of the core, a magnet in said permeability path and fixed relative to said core, said rim being interrupted at circumferentially spaced points to provide walls and spaces alternately making and breaking said permeability path when said rotor is rotating to produce multiple voltage pulses in sinusoidal wave form in each coil and an alternating current output from each coil, a first receiver electrically connected to said first coil, a second receiver electrically connected to said second coil, means for half-wave rectifying the alternating current output from said first coil so that said first receiver is charged with the positive half cycles only of the alternating current output from said first coil, and means for half-wave rectifying the alternating current output from said second coil so that said second receiver is charged with the negative half cycles only of the alternating current from said second coil.

2. A flywheel magneto generator as defined in claim 1, wherein one of said receivers is a capacitor and the other of said receivers is a battery.

3. A flywheel magneto generator as defined in claim 2, and further including an exciter for a spark plug, and means for triggering said capacitor to energize said exciter.

4. A flywheel magneto generator as defined in claim 3, wherein said magnet is mounted on said first end of the core, and said magnet and said second end of the core are mounted closely adjacent to said rim in circumferentially spaced-apart relation to provide air gaps between said magnet and said rim and between said second end of the core and said rim.

5. A flywheel magneto generator as set forth in claim 4, wherein the arcuate distance between said magnet and said second end of the core is a multiple of the arcuate spacing between said walls.

6. A flywheel magneto generator as set forth in claim 4, wherein the arcuate distance between said magnet and said second end of said core is equal to the arcuate spacing between said walls.

7. A flywheel magneto generator as set forth in claim 6, wherein said rotor, including said main body portion and said rim, is of integral, one-piece construction and is made of magnetically permeable material.

8. A flywheel magneto generator as set forth in claim 7, wherein said air gaps are on the order of about 0.3 millimeters.

* * * * *